(12) United States Patent
Fisher et al.

(10) Patent No.: US 8,635,293 B2
(45) Date of Patent: Jan. 21, 2014

(54) ASYNCHRONOUS VIDEO THREADS

(75) Inventors: Danyel Fisher, Seattle, WA (US); Aaron Hoff, Kirkland, WA (US); Mary Czerwinski, Kirkland, WA (US); Kori Inkpen Quinn, Redmond, WA (US); Jeremy Barksdale, Redmond, WA (US); Paul Johns, Tacoma, WA (US); Asta Roseway, Bellevue, WA (US); Gina Venolia, Bellevue, WA (US); John Tang, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 83 days.

(21) Appl. No.: 13/159,201

(22) Filed: Jun. 13, 2011

(65) Prior Publication Data

US 2012/0317210 A1 Dec. 13, 2012

(51) Int. Cl.
*G06F 15/16* (2006.01)

(52) U.S. Cl.
USPC ............................. 709/206; 709/204; 709/207

(58) Field of Classification Search
USPC ................................................ 709/204, 206
See application file for complete search history.

(56) References Cited

U.S. PATENT DOCUMENTS

| | | | | |
|---|---|---|---|---|
| 7,809,789 B2* | 10/2010 | Shuster | ......................... | 709/203 |
| 8,020,105 B1* | 9/2011 | Lemay et al. | ................. | 715/746 |
| 8,046,009 B2* | 10/2011 | Bodmer et al. | ............... | 455/466 |
| 8,078,678 B2* | 12/2011 | Enete et al. | ................... | 709/204 |
| 8,090,779 B2* | 1/2012 | Ludwig et al. | ................. | 709/206 |
| 8,112,487 B2* | 2/2012 | Leedberg et al. | ............. | 709/206 |
| 8,233,885 B2* | 7/2012 | Kansal et al. | ............... | 455/412.1 |
| 8,238,526 B1* | 8/2012 | Seth et al. | ................... | 379/88.11 |
| 8,275,839 B2* | 9/2012 | Auerbach et al. | ............ | 709/206 |
| 8,312,079 B2* | 11/2012 | Newsome et al. | ............ | 709/203 |
| 8,316,095 B1* | 11/2012 | Wheeler et al. | ............... | 709/206 |
| 8,346,864 B1* | 1/2013 | Amidon et al. | ............... | 709/204 |
| 2005/0114781 A1 | 5/2005 | Brownholtz et al | | |
| 2010/0223345 A1 | 9/2010 | Gupta | | |
| 2011/0145354 A1* | 6/2011 | Matsumoto | ................... | 709/206 |
| 2011/0231499 A1* | 9/2011 | Stovicek et al. | ............. | 709/206 |
| 2011/0264751 A1* | 10/2011 | Jans | .............................. | 709/206 |
| 2011/0314113 A1* | 12/2011 | Noda et al. | ..................... | 709/206 |
| 2012/0005287 A1* | 1/2012 | Gadel et al. | ................... | 709/206 |
| 2012/0029917 A1* | 2/2012 | Chang et al. | .................. | 704/235 |
| 2012/0054292 A1* | 3/2012 | Weda et al. | .................... | 709/206 |
| 2012/0072493 A1* | 3/2012 | Muriello et al. | ............. | 709/204 |
| 2012/0079099 A1* | 3/2012 | Dhara et al. | ................... | 709/224 |
| 2012/0185797 A1* | 7/2012 | Thorsen et al. | ............... | 715/784 |
| 2012/0198002 A1* | 8/2012 | Goulart et al. | ............... | 709/206 |
| 2012/0284343 A1* | 11/2012 | Lee et al. | ....................... | 709/206 |
| 2012/0290662 A1* | 11/2012 | Weber et al. | ................... | 709/206 |

OTHER PUBLICATIONS

Video Browsing Using Interactive Navigation Summaries—Published Date: 2009.
Video Collaboratories for Research and Education: An Analysis of Collaboration Design Patterns—Published Date: 2009.

(Continued)

*Primary Examiner* — Melvin H Pollack

(57) ABSTRACT

Described are systems and user interfaces for facilitating asynchronous communication with video threads. Implementations may enable members of a team to have threaded view of video messages, from which they can capture video, record their screen, and send, receive, and reply to a video message. The screen recording feature enables team members to share parts of their screen while simultaneously narrating, if desired. Video messages are threaded by topic and each conversation is visually represented.

19 Claims, 6 Drawing Sheets

(56) References Cited

OTHER PUBLICATIONS

Asynchronous Video Telephony for the Deaf—Published Date: 2007.
Visualisation of Learners' Contributions in Chat Conversations—Published Date: 2007.
Voyagers and Voyeurs: Supporting Asynchronous Collaborative Information Visualization—Published Date: 2007.
Adams, L., Toomey, L., and Churchill, E. Distributed research teams: Meeting asynchronously in virtual space. HICSS-32, (1999).
Andres, H.P. A comparison of face-to-face and virtual software development teams. Team Performance Management 8, 1 (2002), 39.
Espinosa, J.A., Slaughter, S.A., Kraut, R.E., and Herbsleb, J.D. Familiarity, complexity, and team performance in geographically distributed software development. Organization Science 18, 4 (2007), 613-630.
Espinosa, J.A., Slaughter, S.A., Kraut, R.E., and Herbsleb, J.D. Team knowledge and coordination in geographically distributed software development. Journal of MIS 24, 1 (2007), 135-169.
Fish, R.S., Kraut, R.E., and Chalfonte, B.L. The VideoWindow system in informal communication. Proc. CSCW, ACM (1990), 11.
Grinter, R.E., Herbsleb, J.D., and Perry, D.E. The geography of coordination: dealing with distance in R&D work. Proc. Group, ACM (1999), 315.
Harrison, D.A., Mohammed, S., Mcgrath, J.E., Florey, A.T., and Vanderstoep, S.W. Time matters in team performance: Effects of member familiarity, entrainment, and task discontinuity on speed and quality. Personnel Psychology 56, 3 (2003), 633-669.
Herbsleb, J.D., Mockus, A., Finholt, T.A., and Grinter, R.E. Distance, dependencies, and delay in a global collaboration. Proc. CSCW, ACM (2000), 328.
Herbsleb, J.D., Mockus, A., Finholt, T.A., and Grinter, R.E. An empirical study of global software development: distance and speed. Proc. ICSE, IEEE Computer Society (2001), 81-90.
Isaacs, E.A. and Tang, J.C. What video can and cannot do for collaboration: a case study. Multimedia Systems 2, 2 (1994), 63-73.
van der Kleij, R., Maarten Schraagen, J., Werkhoven, P., and De Dreu, C.K.W. How Conversations Change Over Time in Face-to-Face and Video-Mediated Communication. Small Group Research 40, 4 (2009), 355.
O'Leary, M.B. and Cummings, J.N. The spatial, temporal, and configurational characteristics of geographic dispersion in teams. MIS Quarterly 31, 3 (2007), 433-452.
Olson, G.M. and Olson, J.S. Distance matters. HCI 15, 2 (2000), 139-178.14. Tang, J., Zhao, C., Cao, X., and Inkpen, K. Your Time Zone or Mine? A Study of Globally Time Zone-Shifted Collaboration. Submitted to CSCW 2011.
Veinott, E.S., Olson, J., Olson, G.M., and Fu, X. Video helps remote work: Speakers who need to negotiate common ground benefit from seeing each other. Proc. CHI, ACM (1999), 309.

\* cited by examiner

ASYNCHRONOUS VIDEO THREADS

BACKGROUND

Collaborators such as software development teams, interest groups, and research workgroups are often geographically scattered and span many time-zones. When there is at least some window of overlap in the normal working hours of distant collaborators, synchronous real-time fact-to-face video conference or telepresence communication can be scheduled within that window. When such a window does not exist and synchronous communication is not practical, the quality of communication in a group often degrades. Along with the lack of true conversation, various cues and signals available in face-to-face interaction may also be absent.

Asynchronous communication tools such as email and discussion boards help dispersed teams work together more effectively. However, some communication nuance is not possible with text-based tools. This may explain why studied communication patterns of temporally distributed teams indicate that members often try to find ways to interact synchronously, despite time zone differences of eight hours or more. Previous communication tools have not provided the benefits of synchronous real-time communication in an asynchronous format.

Described below are thread-based visualization tools to manage asynchronous video conversations.

SUMMARY

The following summary is included only to introduce some concepts discussed in the Detailed Description below. This summary is not comprehensive and is not intended to delineate the scope of the claimed subject matter, which is set forth by the claims presented at the end.

Described are systems and user interfaces for facilitating asynchronous communication with video threads. Implementations may enable members of a team to have threaded view of video messages, from which they can capture video, record their screen, and send, receive, and reply to a video message. The screen recording feature enables team members to share parts of their screen while simultaneously narrating, if desired. Video messages are threaded by topic and each conversation is visually represented.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Figure 1:
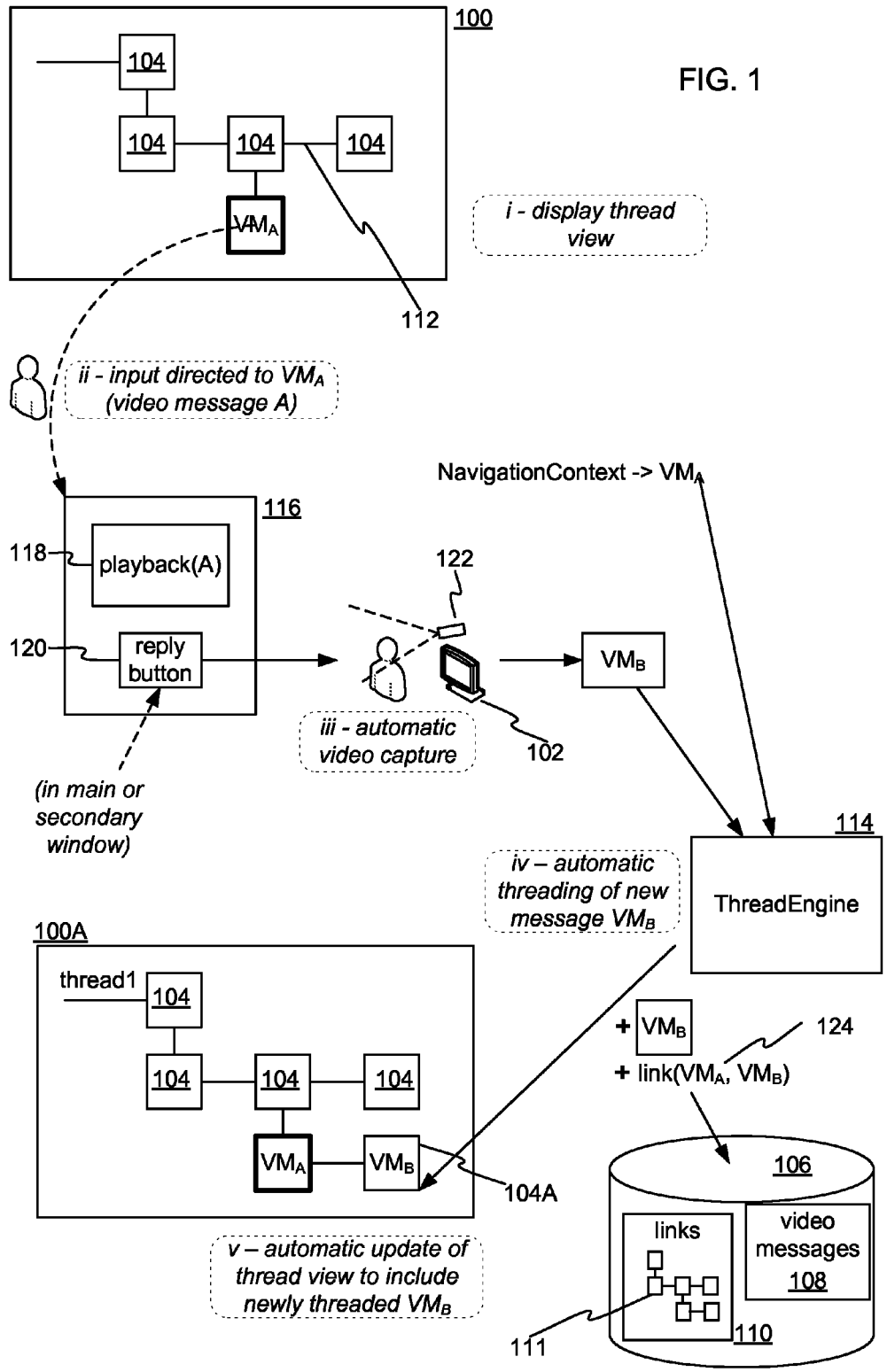
FIG. 1 shows a threaded video messaging system.

FIG. 1 shows a threaded video messaging system. Components of the system will be explained first, followed by discussion of the flow of an example use of the system.

The video messaging system centers around a threaded video message view 100, which may be presented in an application window, a web page, or the like, and displayed on a display 102. The threaded video message view 100 displays message icons 104 that represent respective video messages stored in a data store 106, for example, in one or more video message tables 108. A stored video message includes at least playable video data (a video clip) and any associated data, in particular, message data such as an identifier of an author or sender, a date and time the message was sent or added, metadata, and so forth. Other tables and data may be stored in data store 106, for instance, a conversation table with records for respective different conversations, a table with records associating video messages with particular conversations (in FIG. 1, only one conversation is shown in message view 100), a table of users indexed by user identifiers, etc. A links table 110 may contain records associating video messages; a record may have a first field with a first message identifier and a second field with a second message identifier, thus indicating that the two referenced messages are linked or threaded together.

Considered as a whole, the data in the data store 106 stores hierarchies of video message or video clips (see message hierarchy 111 corresponding to view 100A), where each hierarchy is a different conversation, thread, group of topically related messages, etc. Given a particular conversation or thread, the thread engine 114 analyzes links 110 and video messages 108 to generate a hierarchy data structure. From this message or video clip hierarchy, a corresponding hierarchical video message view can be generated. Such a hierarchy may have a visual link 112 or line—displayed in the video message view 100—which corresponds to a link record in links table 110 that links two video messages corresponding to the message icons 104 connected by the visual link 112 (note that lines may be curved, straight, etc.). Additional details for implementing messaging in general are available elsewhere.

A thread engine 114 may maintain messaging and threading data in the data store 106. Threading may be driven by new video messages; new messages are threaded in as they are added to a conversation. Threading, however, need not be based on messaging between users, and while video messages are discussed, video clips may be threaded without the need for transmitting messages. Nor is there any requirement that video messages be submitted in reply to a video message of another user; in one embodiment any user (possibly only members of a defined group) can submit a video message anywhere. Furthermore, a video message can be inserted or threaded to any existing video message; there is no requirement that a reply be directed to a "leaf" message. Video messages can be created and threaded into a conversation manually or automatically based on content analysis (analysis of speakers in video data, analysis of associated metadata, etc.). A video blog type of view can be implemented where a single user continually adds video messages to their own video message threads.

Returning to threaded video message view 100, as mentioned, a video message is represented by message icon 104, which may be a thumbnail of a frame from the video data of the corresponding video message. In one embodiment, the threaded view of message icons 104 corresponds to a particular conversation selected by a user (see selector element 260 in FIG. 5). The message icons 104 may be laid out in different ways, for example, according to user, and/or time, semantic proximity, etc., but nonetheless includes lines or other graphics that indication connections between linked video messages, i.e., the view shows message threads. Hovering a pointer over a message icon 104 may trigger display of metadata about the corresponding video message and/or display of interactive interface elements (e.g., the various buttons and controls described herein).

The threaded video message view 100 may have various user interface elements to allow the user to input commands and invoke operations. In one embodiment, a current navigation context is maintained, which includes, for example, the current conversation, a video message that is currently selected, etc. In another embodiment, navigation state is implicitly stored as the state of user interface elements that make up the view. To invoke operations, the user may use keyboard shortcuts, graphical user interface elements, and the like. In the example shown in FIG. 1, an interface element 116 may have a playback button 118 and a reply button 120. Instances of the interface element 116 may be overlaid on each message icon 104 (activation of a button thereof will result in an operation on the corresponding video message), or a single instance may be displayed (activation of a button will operate on a currently selected video message).

Conceptually, the threaded video message view 100 may be thought of as a single media player and messaging application, but with the ability to manipulate threaded video message conversations shown in its window (e.g., threaded video message view 100), and with the ability to direct media and messaging operations to conversations and messages and threads thereof shown in its window or view. In other words, the interface may be viewed as a single specialized video message player within which video messages (viewed in threads) may be individually and directly (or in groups) played, responded to with a new video message, annotated, etc. In some implementations, with a single click or other form of input, a user can play or start a reply to a designated video clip or message.

Flow of how a user may respond to a video message is now explained. At step (i), a threaded view of a conversation is displayed. In the example, message icons 104 and currently selected message icon VMA represent corresponding video messages. The lines between the icons represent relationships between the video messages. At step (ii), input (e.g., "reply" input) is directed to the video message represented by icon VMA. The current message/icon may be set by either interacting with the icon directly (clicking it, clicking a button thereon, etc.), or by first designating the icon and then invoking a command which operates on the video message of the designated icon. In the present example, reply button 120 is activated, which triggers step (iii).

At step (iii), in direct response to the reply command directed to a particular video message/icon, a video capture operation begins. The video may be captured by a camera 122, a screen-capture tool, or a combination thereof. While or after the video is captured (of the user and/or content displayed on the user's display 102), the video is stored and associated with a new video message $VM_B$. In a true messaging implementation, this may be similar to an email client generating a new email message when replying to a received email. Various data may be added to the new video clip or message $VM_B$, such as the identity of the current user, the time the video message was generated, a subject or other information entered by the user, the identity of the current conversation, the identity of the video message being replied to (video message $VM_A$), and so on.

At step (iv), the thread engine 114 receives the new video message $VM_B$ and threads the new video message, for example, adding a link record 124 to the links table 110 and storing the video message $VM_B$ in the video messages table 108. At step (v), the threaded video message view 100 is automatically redisplayed as view 100A, reflecting the new video message $VM_B$; a message icon 104A is shown linked to the icon of video message $VM_A$. If other users are running instances of the threaded video message view, their views may also be updated in due course. Furthermore, if other such users submit new video clips or messages in reply to the viewed clips or messages via their views, any views are similarly updated.

In one embodiment, the video messaging system is a client-server type system. The thread engine 114, which might act as a network service, receives messaging input from client applications (message view instances of different users) and sends to clients display data. A client renders the display data to display a threaded video message view. The display data may be high level semantic information about which messages/clips exist, how they are related, etc. The display data may be renderable data such as hypertext markup language or extensible markup language, information conveyed by a client-server protocol, low-level graphic elements, actual executable code (e.g., Java™ or .Net™ bytecode), etc. The client applications can update according to the display data, render or execute the display data, or otherwise use the display data to display their respective instances of the threaded video message view 100. If one client submits a new video message in its threaded video message view 100, the new video message eventually becomes viewable in its own view and the views of the other clients.

In another embodiment, the network functionality (communication between users, etc.) is handled by an email client, and the threaded video message view is a component of the email client for viewing and responding to threaded video messages. Underlying email functionality can be readily leveraged. In one embodiment, various pieces of data are stored in a cloud or server cluster and threaded video messaging is provided as a serviced that is accessed by users through a client interface such as a web browser or the like.

Figure 2:
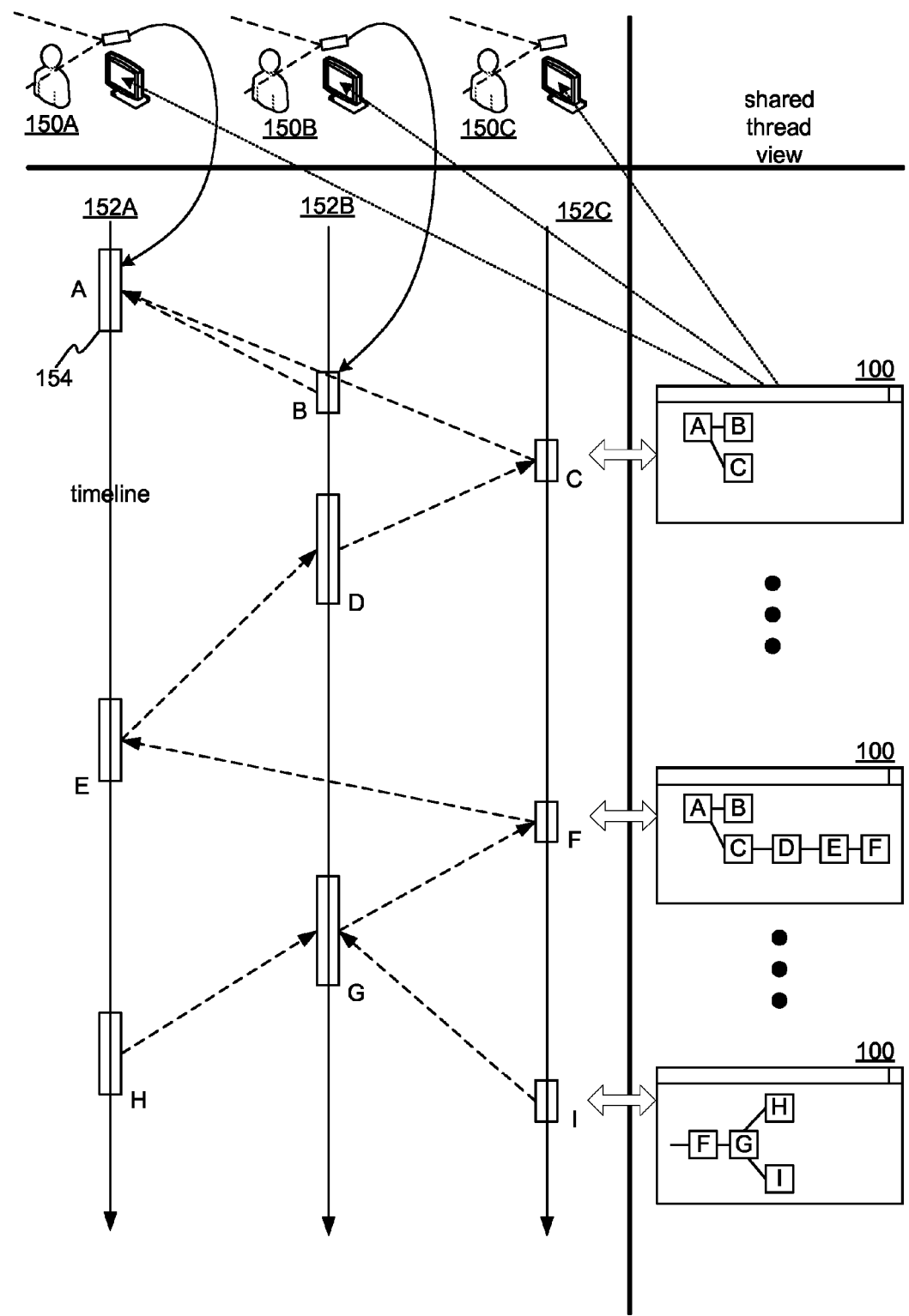
FIG. 2 shows a chronology of example video message exchanges.

FIG. 2 shows a chronology of example video message exchanges. Users 150A, 150B, and 150C have terminals with respective cameras and displays, each at various times, displaying respective instances of threaded video message view 100. The activities of the users 150A, 150B, 150C are illustrated along respective timelines 152A, 152B, 152C. Letters "A" to "I" will be used to indicate both video messages and corresponding points in time. Initially, one of the users creates a new asynchronous video conversation. User 150A creates a first video message A at time A. Note that blocks 154 represent duration of messages. User 150B responds with message B via his or her instance of threaded video message view 100. User C, whose view has been updated to reflect messages A and B, interacts with a local icon of message A to direct a reply to video message A, resulting capture of video (screen or camera video) and new video message C. After time/message C, threaded video message view 100 shows icons A, B, C, and corresponding thread lines. This back-and-forth video messaging or posting continues up to time I. Again, a formal messaging system need not be used. Asynchronous video sharing can be performed with any system or service that allows users to view and post video clips.

Figure 3:
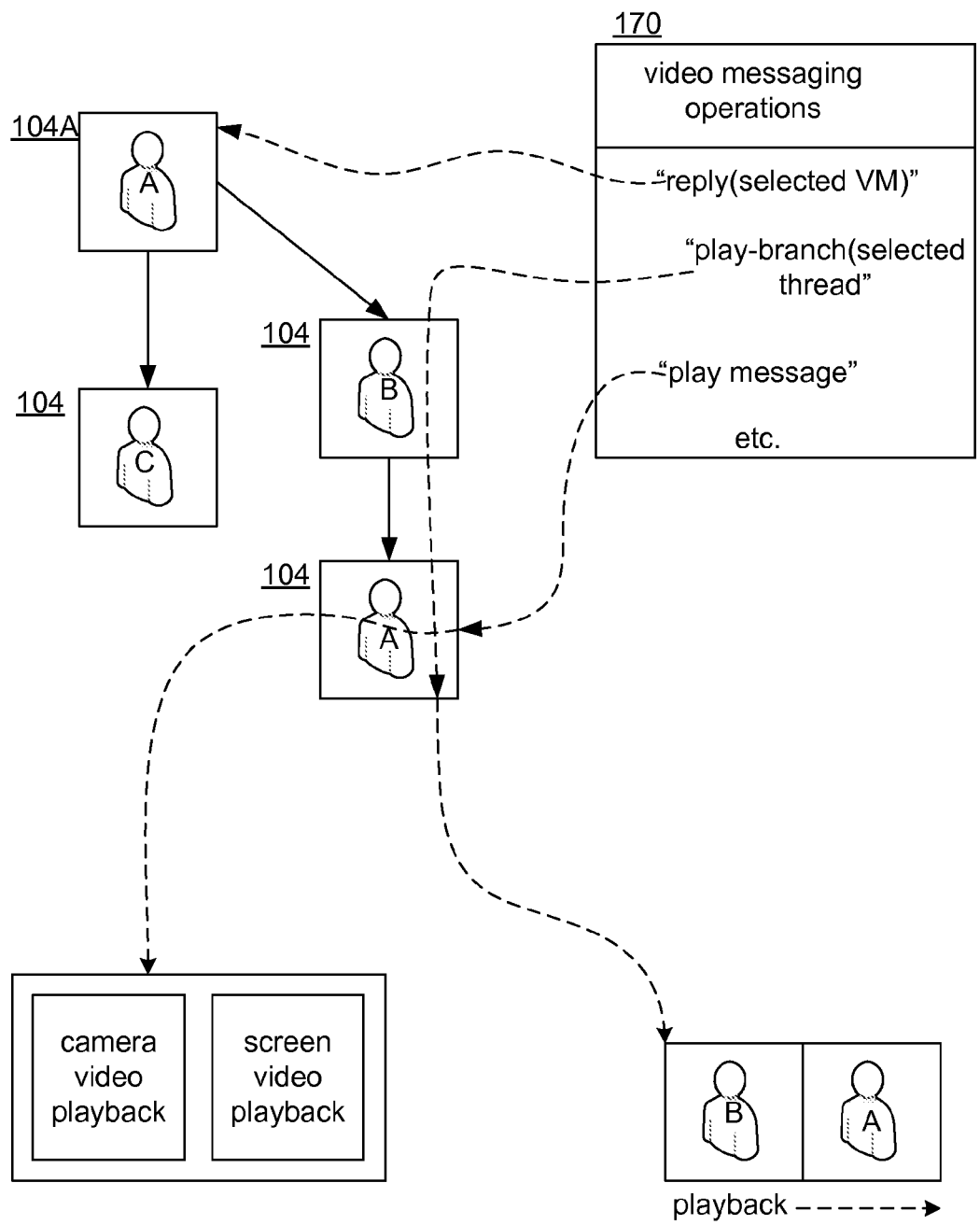
FIG. 3 shows video messaging operations.

FIG. 3 shows video messaging operations 170. The messaging operations 170 can be invoked as discussed above with reference to FIG. 1. As described above, the user is able to directly interact with video messages or clips. The letters "A" to "C" in FIG. 3 represent users A, B, and C, respectively (the upper message icon 104 is an image of user A, who created and appears in the corresponding video message). Any operation may be directed to a particular video message/clip/icon. For example, user B can click a "reply" button on icon 104A and a reply video message is immediately started. A user may select a thread or path in the view (e.g., the sequence B-A, by selecting message B), and may invoke a play-thread operation that plays the video messages B and A (lower A in FIG. 3) in sequence as though a single clip of video. A user may invoke a play operation to play a single video message, for example, by clicking an icon or a "play" button on a message icon 104, which results in the video message being played, either in a larger pop-up window, or directly in the space of the icon, or in a separate display area. In sum, video messaging operations can be invoked with minimal or even single user inputs.

Asynchronous video communication may be supplemented by various messaging tools and features. For example, a user may be allowed to create in-line replies when playing a video message; the reply is linked not only to the clip being played, but also to a particular part of the clip. An impression feature may be provided by which video of a recipient playing back a video message is captured (either as a new message, or as data associated with the played-back video message), thus allowing a sender to later view a recipient's (or other viewer's) reaction. Reaction capturing may be explicitly requested with a video message, or a viewer may activate reaction-capture during playback. In one embodiment, a user composing a video message may include markers where feedback is desired, possibly leading to a prompt during playback for video or other form of feedback. A visual indicator such as a pencil icon may fade in and overlay the playing video and fade out when the marked period of desired feedback passes. Any feedback is associated with the time of the video message to which the feedback is directed. Signals about user impression can be captured and conveyed. For instance, features such as pitch, speaking time, amount of movement and agreement, etc., can be automatically analyzed and returned to the user in the form of user interface metadata.

Figure 4:
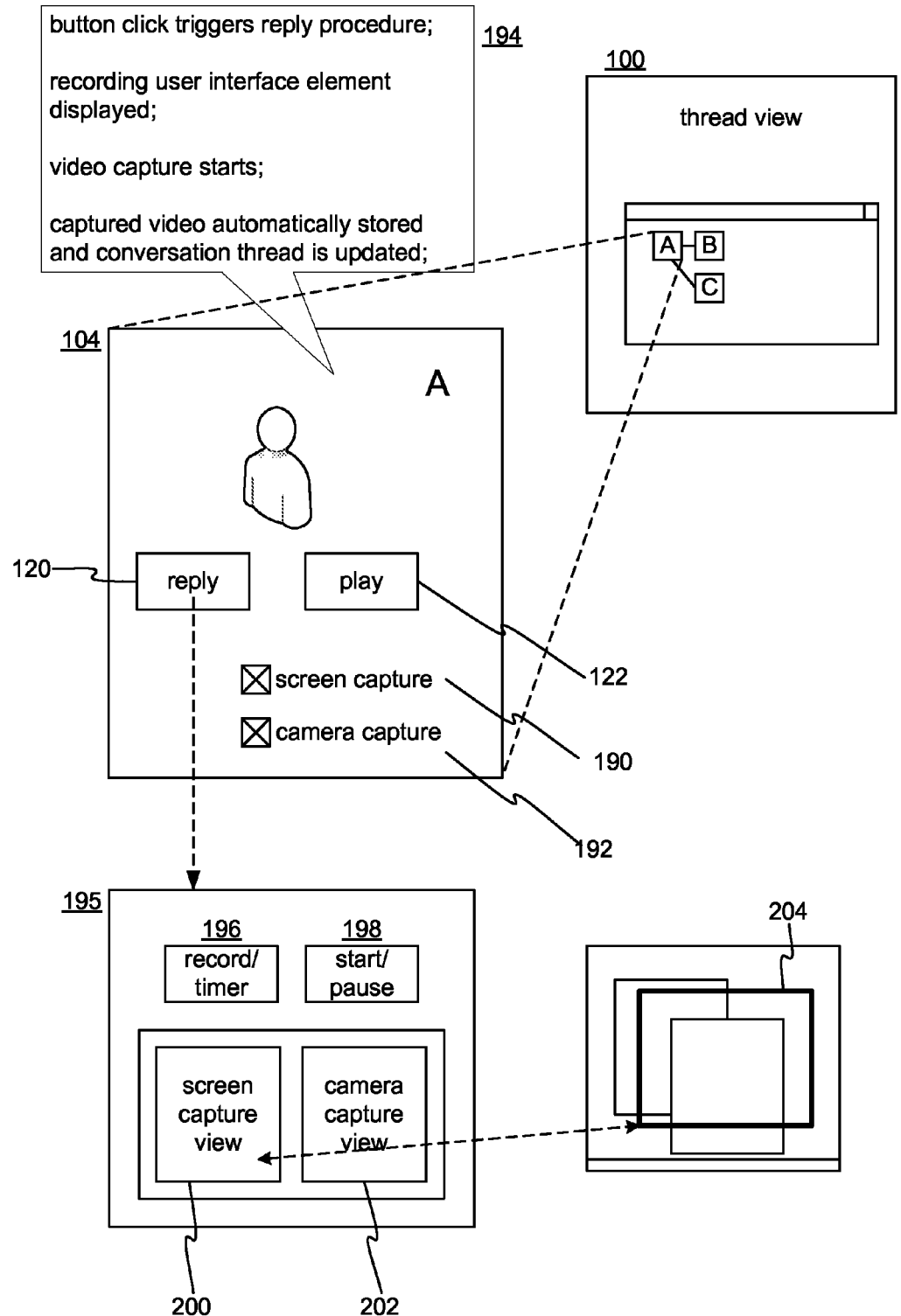
FIG. 4 shows detail of a threaded video messaging interface.

FIG. 4 shows detail of a threaded video messaging interface. In this embodiment, a message icon 104 has an image, a reply button 120, a playback button 122, a screen capture checkbox 190, and a camera capture checkbox 192. Process 194 shows steps for replying to a video message. Starting with activation of reply button 122, a reply user interface element 195 is displayed. The reply user interface element 195 may be a display pane or window accompanying the threaded video message view 100. A slider element 196 may indicate how much video has been captured and may allow moving the current capture point. A start/pause button 198 may allow video capture to be started and paused. A screen capture view 200 may be displayed which shows live screen video as it is being captured, and a camera view 202 of video being captured by camera may also be displayed. If the screen capture checkbox 190 is selected, another interface element may be provided that allows the user to select a part of the screen to be captured, for instance, a selector to identify a window, or a frame tool 204 that can be moved and resized to frame an area of the screen to be captured, etc. As described above, when a video capture is finished, a corresponding video message is generated, stored/transmitted, and delivered or posted. If a video message contains screen-capture video, its corresponding message icon 104 may include a camera icon or other visual indication of the presence of screen video.

When composing a reply, or when composing a new video message, annotations may be added. For example, text annotations may be inserted at various points in a video clip. When played back, the annotations fade in for some duration and then fade out. Annotations may include hyperlinks and other forms of media. Graphic annotations may be overlaid on top of video, for instance, highlighted regions, lines/pointers, etc.

Figure 5:
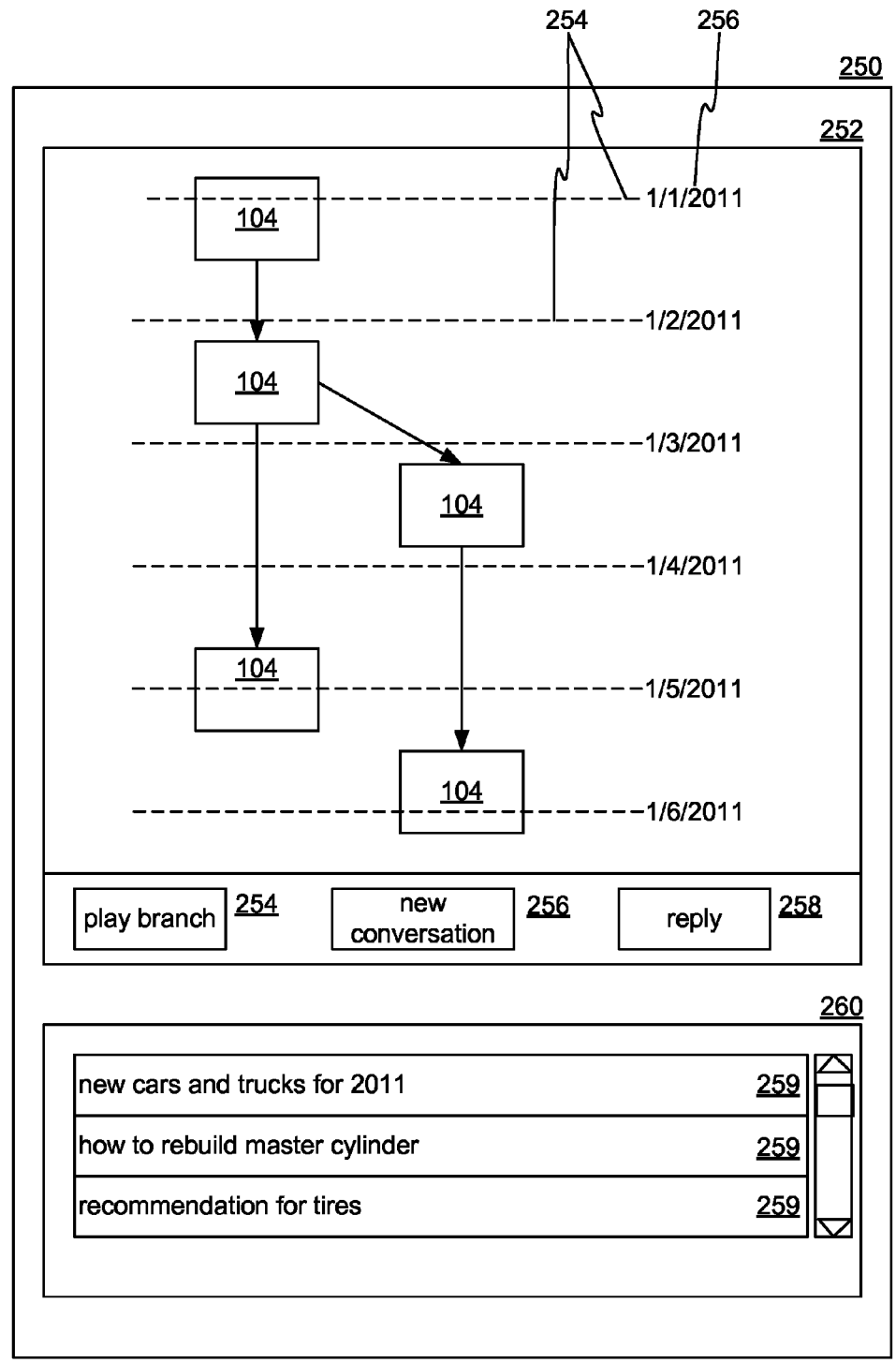
FIG. 5 shows another video messaging interface.

FIG. 5 shows another video messaging interface 250. A time-ordered thread view 252 shows message icons 104 in chronological order. Lines 254 and dates indicate when video messages represented by the message icons 104 were submitted. In addition, a play-thread button 254, a new-conversation button 256, and a reply button 258 are available. The play-branch button 254 causes a sequence of video messages in a currently selected thread or sub-thread to be played in sequence. The new-conversation button 256 creates a new threaded asynchronous video conversation (and appropriate entry in selector element 260). Note that the time-ordered thread view 252 shows messages of a currently selected conversation, which may be selected from among available conversations 259 using selector element 260. When a new conversation 259 is selected, the corresponding video messages are shown, threaded, in time-ordered thread view 252.

Different types of thread layouts may be used. For example, messages may be threaded and displayed according to implied links, such as relations between users. One approach is to automatically lay out message icons 104 based first on links between messages, and with placement of message icons otherwise driven by any of a variety of known algorithms for generating graph layouts.

In an embodiment where special client applications and a dedicated server are used, notifications of new video messages may be sent via email to corresponding recipients. Notifications may include information about the video message and a link to open the message. Screen capturing may be accompanied by only voice recording instead of camera-captured video, thus allowing a user to create a video message by narrating a screen-capture sequence. In yet another embodiment, messages of different media types are used, and a conversation thread visualization may include emails, instant messages, phone messages, and other message types besides video messages.

Given a large set of video messages, it may be helpful to include a search function to allow users to search for video messages to find particular content or quickly browse a conversation. Video editing features may be included to allow custom editing and composition of video content in a video message, inserting images or external clips, etc. Moreover, tagging of video messages by users may be implemented, as well as automatic detection of subjects in thread of messages. Analysis of text may be implemented with speech-to-text recognition software that translates video clips (audio) into text.

In other embodiments, video messages are post-processed to extract additional information that is collected and indexed for searching or other uses. For example, keywords are extracted from text of the messages and/or from text generated by speech-to-text processing of audio data of the messages. In another embodiment video frames are analyzed to extract information about the video such as scene information, recognized faces, etc. Where participants are expected to speak different languages, language translation may also be used to allow cross-language searching, indexing, etc. In another embodiment, the video of a message is analyzed to identify a key scene icon to be used as the icon representing the message (rather than just using the first frame of the video). A search interface may be enhanced by presenting such icons with keywords extracted from the audio or otherwise obtained. Similar approaches and presentation of icons can also be used for managing threads or other tasks.

CONCLUSION

Figure 6:
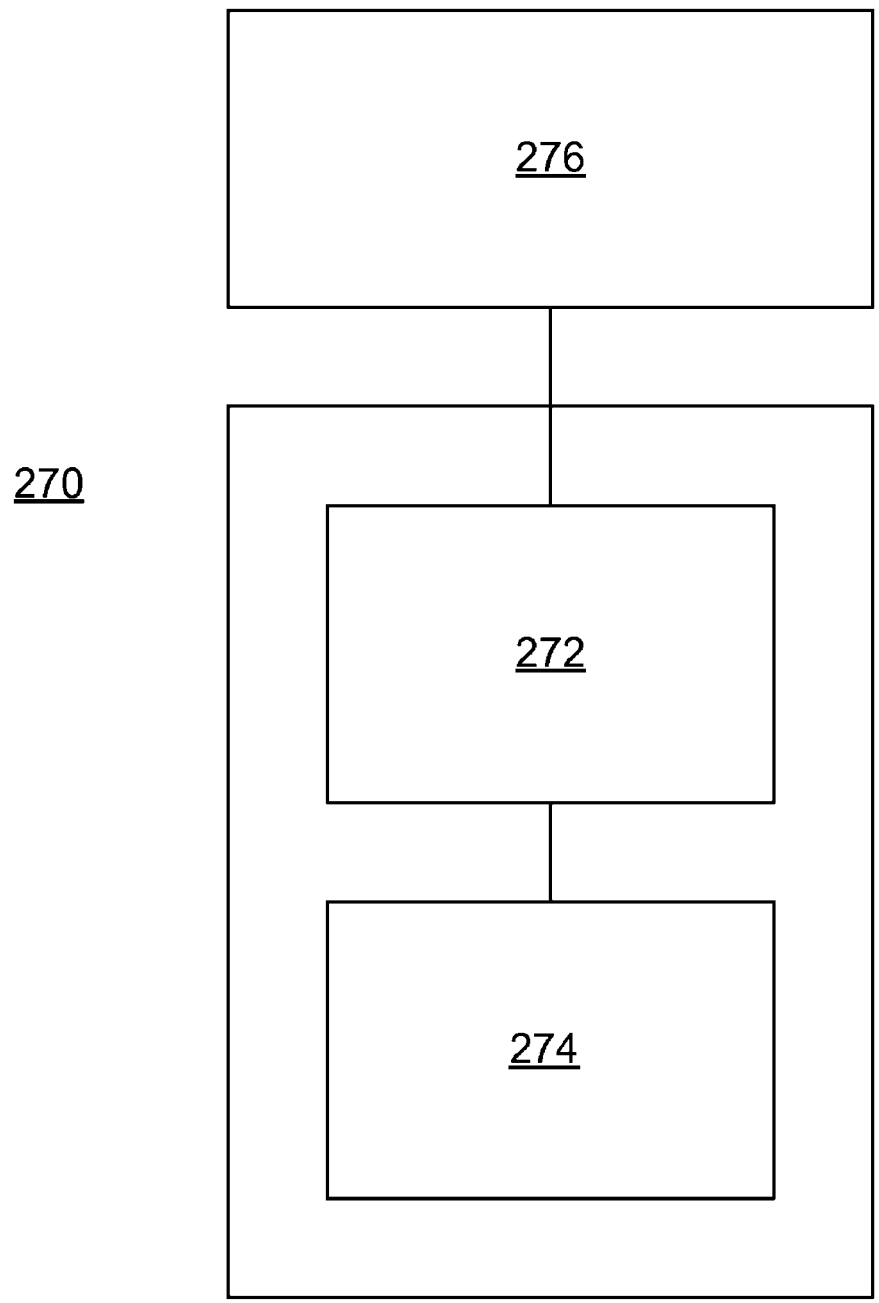
FIG. 6 shows an example computer.

FIG. 6 shows an example computer 270. Computer 270 may have a processor 272, storage 274, and a display 276. The storage 274 may include computer readable storage media and memory. Embodiments and features discussed above can be realized in the form of information stored in such volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of threading video messages, the method comprising:
   automatically maintaining a data store storing a set of video messages and thread information interrelating the video messages, the video messages having been recorded and submitted as messages from users;
   generating a thread view user interface from the video messages and the thread information, the thread view comprising graphic representations of the video messages, respectively and graphic indicia of connections corresponding to commonalities between the video messages;
   displaying the thread view user interface at a computer operated by one of the users; and
   receiving, via the thread view user interface, user input comprising a user interaction with a user-designated one of the graphic representations corresponding to a user-designated one of the video messages, and in response to receiving the user input automatically generating a new video message responding to the user-designated video message by:
      automatically capturing video at the computer as part of the new video message,
      automatically storing the new video message in the data store, and
      automatically updating the thread information to link the new video message to the user-designated video message, whereby the new video message becomes available to the users when the users access the video messages.

2. A method according to claim 1, further comprising: automatically adding to the thread view user interface a new icon representing the new video message and a new graphic indication representing the link between the new video message and the user-designated video message.

3. A method according to claim 2, wherein the capturing video at the computer comprises capturing a sequence of video from a user designated portion of a display of the computer.

4. A method according to claim 2, wherein the capturing the video at the computer comprises capturing video of the user from a camera attached with the computer.

5. A method according to claim 1, further comprising receiving additional user input directed to a user-designated path through the hierarchy of message icons, and in response automatically playing the corresponding video messages consecutively in an order corresponding to an order of the message icons in the user-designated path.

6. A method according to claim 1, wherein the video messages have creation times, and given a first portion of the thread view and a second portion of the thread view, the graphic representations are automatically arranged such that, given any first graphic representation of a first video message that is older than a second video message of a second graphic representation, the first graphic representation is closer to the first edge than the second graphic representation.

7. A method of asynchronous video messaging, the method comprising:
   accessing link information that identifies a hierarchy of linked video clips;
   based on the link information, generating display information comprising information that when processed by a computer allows the computer to display a thread view, the thread view, when displayed, comprising an interactive view area containing a hierarchy graphic comprised of icons representing the video clips and graphic indications of respective connections between the icons, where the thread view, when displayed, can be interacted with by the user to play the video clips and to insert new video clips into the hierarchy of linked video clips; and
   allowing the user to, with only a single command: reply to a video clip selected by the user, where the replying includes capturing a new video clip and automatically adding the new video clip to the hierarchy of linked video clips by linking the new video clip to the selected video clip.

8. A method according to claim 7, wherein each icon is an interactive user interface element that can be activated to play the corresponding video clip or to record a new clip that is threaded to the activated icon.

9. A method according to claim 7, wherein the thread view is displayed by an email client.

10. A method according to claim 7, further comprising performing analysis on one or more frames and/or audio clips of the video clips.

11. A method according to claim 10, wherein the analysis comprises image processing of the frames to identify key icons to represent the video messages or to identify content in the video clips, and the method further comprises either displaying the key icons to represent the video messages or indexing keywords that correspond to the identified content.

12. A method according to claim 7, further comprising performing speech-to-text processing on audio data of the video clips and storing and using the resulting text for the video messaging.

13. A method according to claim 7, further comprising displaying a selection tool that lists indicia of a plurality of different hierarchies of linked video clips, and responding to selection of a listed hierarchy of linked video clips by replacing, in the thread view, a new graphic hierarchy corresponding to the selected hierarchy of linked video clips, whereby a user is able to select which hierarchy of linked video clips is currently displayed.

14. One or more computer readable storage devices storing information that when executed by a computer causes the computer to perform a process, wherein the computer readable storage media is not a signal, the process comprising:

displaying a user interface comprising a threaded view of videos, the threaded view comprising:

a plurality of icons representing corresponding videos, each video comprising a clip of video data, connection graphics indicating connections between icons corresponding to link data indicating links between the video messages, the connection graphics having been generated based on information indicating which video messages are replies to which other video messages; and providing user interface elements that allow a user to play the videos and to record video responses to the videos, where the link data is automatically updated to include links between video responses and videos to which the video responses were directed.

15. One or more computer readable storage devices according to claim 14, the process further comprising receiving indications of new videos via a network, and displaying new icons representing the new videos and new graphics indicating connections between the icons and the new icons, the new videos having been generated by users interacting with respective instances of the user interface.

16. One or more computer readable storage devices according to claim 15, wherein, given a series of linked icons selected by the user, the process further comprises responding to input from the user by playing all of the videos corresponding to the series of linked icons.

17. One or more computer readable storage devices according to claim 14, the process further comprising receiving a command inputted by the user in association with an icon designated by the user, and in response automatically capturing video from a camera and/or video of a video signal being displayed on a display of the computer, and automatically adding the captured video to the link data.

18. One or more computer readable storage devices according to claim 14, further comprising storing annotations entered by the user in association with the captured video such that when the captured video is played the annotations are displayed with the captured video.

19. One or more computer readable storage devices according to claim 14, the process further comprising performing speech-to-text translation on videos.

\* \* \* \* \*